United States Patent
Goodwin et al.

(10) Patent No.: US 12,028,311 B2
(45) Date of Patent: *Jul. 2, 2024

(54) METHODS AND SYSTEMS FOR EFFICIENT VIRTUALIZATION OF INLINE TRANSPARENT COMPUTER NETWORKING DEVICES

(71) Applicant: Centripetal Networks, LLC, Portsmouth, NH (US)

(72) Inventors: Richard Goodwin, York, ME (US); Paul Sprague, North Berwick, ME (US); Peter Geremia, Portsmouth, NH (US); Sean Moore, Hollis, NH (US)

(73) Assignee: Centripetal Networks, LLC, Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/212,411

(22) Filed: Jun. 21, 2023

(65) Prior Publication Data

US 2023/0336522 A1 Oct. 19, 2023

Related U.S. Application Data

(63) Continuation of application No. 18/102,378, filed on Jan. 27, 2023, now Pat. No. 11,902,240, which is a
(Continued)

(51) Int. Cl.
*H04L 61/2521* (2022.01)
*H04L 45/00* (2022.01)
(Continued)

(52) U.S. Cl.
CPC ......... *H04L 61/2528* (2013.01); *H04L 45/68* (2013.01); *H04L 61/2514* (2013.01); *H04L 2101/622* (2022.05); *H04L 2101/668* (2022.05)

(58) Field of Classification Search
CPC . H04L 61/2528; H04L 45/68; H04L 61/2514; H04L 2101/622; H04L 2101/668;
(Continued)

(56) References Cited

U.S. PATENT DOCUMENTS

| 5,226,141 A | 7/1993 | Esbensen |
| 6,678,835 B1 | 1/2004 | Shah et al. |

(Continued)

FOREIGN PATENT DOCUMENTS

EP 2482522 A1 8/2012

OTHER PUBLICATIONS

Toumi, et al., "Implementing Hy-IDS, Mobiles Agents and Virtual Firewall to Enhance the Security in IaaS Cloud," Procedia Computer Science, Elsevier, Amsterdam, NL, vol. 160, Jan. 1, 2019, pp. 819-824, XP085919781.

(Continued)

*Primary Examiner* — Aftab N. Khan
(74) *Attorney, Agent, or Firm* — Banner & Witcoff, Ltd.

(57) ABSTRACT

Network devices that are inserted inline into network links and process in-transit packets may significantly improve their packet-throughput performance by not assigning L3 IP addresses and L2 MAC addresses to their network interfaces and thereby process packets through a logical fast path that bypasses the slow path through the operating system kernel. When virtualizing such Bump-In-The-Wire (BITW) devices for deployment into clouds, the network interfaces must have L3 IP and L2 MAC addresses assigned to them. Thus, packets are processed through the slow path of a virtual BITW device, significantly reducing the performance. By adding new logic to the virtual BITW device and/or configuring proxies, addresses, subnets, and/or routing tables, a virtual BITW device can process packets through the fast path and potentially improve performance accordingly. For (Continued)

example, the virtual BITW device may be configured to enforce a virtual path (comprising the fast path) through the virtual BITW device.

46 Claims, 6 Drawing Sheets

Related U.S. Application Data continuation of application No. 17/698,164, filed on Mar. 18, 2022, now Pat. No. 11,570,138, which is a continuation of application No. 17/395,120, filed on Aug. 5, 2021, now Pat. No. 11,316,823.

(60) Provisional application No. 63/071,174, filed on Aug. 27, 2020.

(51) Int. Cl.
*H04L 61/2514* (2022.01)
*H04L 61/59* (2022.01)
*H04L 101/622* (2022.01)
*H04L 101/668* (2022.01)

(58) Field of Classification Search
CPC ..... H04L 61/59; H04L 45/66; H04L 61/2582; G06F 9/45558; G06F 2009/45595
See application file for complete search history.

(56) References Cited

U.S. PATENT DOCUMENTS

| | | |
|---|---|---|
| 7,095,716 B1 | 8/2006 | Ke et al. |
| 7,185,368 B2 | 2/2007 | Copeland, III |
| 7,254,114 B1 | 8/2007 | Turner et al. |
| 7,320,022 B2 | 1/2008 | Hayter et al. |
| 7,499,412 B2 | 3/2009 | Matityahu et al. |
| 7,594,270 B2 | 9/2009 | Church et al. |
| 7,849,502 B1 | 12/2010 | Bloch et al. |
| 8,042,149 B2 | 10/2011 | Judge |
| 8,219,675 B2 | 7/2012 | Ivershen |
| 8,271,645 B2 | 9/2012 | Rajan et al. |
| 8,413,238 B1 | 4/2013 | Sutton |
| 8,422,391 B2 | 4/2013 | Zhu |
| 8,560,646 B1* | 10/2013 | Sivasubramanian ........ H04L 41/0895 709/230 |
| 9,172,627 B2 | 10/2015 | Kjendal et al. |
| 9,306,949 B1 | 4/2016 | Richard et al. |
| 9,342,691 B2 | 5/2016 | Maestas |
| 9,392,003 B2 | 7/2016 | Amsler |
| 9,503,529 B2 | 11/2016 | Li et al. |
| 9,634,911 B2 | 4/2017 | Meloche |
| 10,374,972 B2 | 8/2019 | Tremblay et al. |
| 11,088,948 B1 | 8/2021 | Talur et al. |
| 11,140,132 B1 | 10/2021 | Samaha |
| 11,184,277 B1 | 11/2021 | Talur et al. |
| 11,310,149 B1 | 4/2022 | Deb et al. |
| 2004/0015905 A1 | 1/2004 | Huima |
| 2004/0123220 A1 | 6/2004 | Johnson et al. |
| 2004/0249975 A1 | 12/2004 | Tuck et al. |
| 2006/0048142 A1 | 3/2006 | Roese et al. |
| 2007/0097976 A1 | 5/2007 | Wood et al. |
| 2007/0118894 A1 | 5/2007 | Bhatia |
| 2008/0229415 A1 | 9/2008 | Kapoor et al. |
| 2008/0320116 A1 | 12/2008 | Briggs |
| 2009/0103524 A1 | 4/2009 | Mantripragada et al. |
| 2009/0249482 A1 | 10/2009 | Sarathy |
| 2009/0262741 A1 | 10/2009 | Jungck et al. |
| 2009/0328219 A1 | 12/2009 | Narayanaswamy |
| 2011/0055916 A1 | 3/2011 | Ahn |
| 2011/0145391 A1* | 6/2011 | Ivershen ............ H04L 63/0272 709/227 |
| 2013/0262655 A1 | 10/2013 | Deschenes et al. |
| 2014/0280778 A1 | 9/2014 | Paxton |
| 2015/0207809 A1 | 7/2015 | Macaulay |
| 2015/0312216 A1* | 10/2015 | Mohan ............ G05B 19/41855 726/11 |
| 2016/0234112 A1* | 8/2016 | Anand ................ H04L 45/38 |
| 2019/0028691 A1* | 1/2019 | Hinds ................ H04N 21/4518 |
| 2019/0306086 A1 | 10/2019 | Boutros et al. |
| 2019/0379600 A1* | 12/2019 | Bisht .................. H04L 61/2521 |
| 2020/0344088 A1* | 10/2020 | Selvaraj ............ H04L 49/3009 |
| 2020/0344323 A1* | 10/2020 | Sodagar ........... H04N 21/64784 |
| 2021/0004273 A1* | 1/2021 | You ........................ G06F 9/5027 |
| 2021/0314277 A1* | 10/2021 | Rolando .............. H04L 67/563 |
| 2021/0385126 A1* | 12/2021 | Klous ................. H04L 43/0847 |
| 2021/0409336 A1 | 12/2021 | Talur et al. |
| 2022/0303246 A1* | 9/2022 | Miriyala ................ G06F 21/53 |
| 2023/0045247 A1* | 2/2023 | Talur .................. H04L 43/0823 |

OTHER PUBLICATIONS

Jan. 15, 2024 (US)—Communication—App 21786041.0, 7 pages.
Jackson, E.J., et al., "(SoftFlow): A Middlebox Architecture for Open {vSwitch}," 2016 Usenix Annual Technical Conference *Usenix ATC 16), 2016, pp. 15-28.
Sep. 28, 2023 (AU) Examination Report No. 1, App 2021331195, 7 pages.
Blake, et al., "An Architecture for Differentiated Services," Network Working Group RFC 2475, Dec. 1998, 36 pages.
Bradner, "The Internet Standards Process—Revision 3," Network Working Group RFC 2026, Oct. 1996, 36 pages.
C. Fellin, et al., "Preventing Mistraining of Anomaly-Based IDSs through Ensemble Systems," 2014 IEEE 10th World Congress on Services, (2014) pp. 66-69.
Cisco ACNS Software Configuration Guide for Centrally Managed Deployments, Release 5.5 ("ACNS Guide"), 2006, 944 pages.
Golnabi, et al., "Analysis of Firewall Policy Rules Using Data Mining Techniques," 2006 IEEE, pp. 305-315.
Ingate Firewall/SIParator® SIP Security Best Practice ("Ingate"), published Sep. 2, 2008, 15 pages.
J. Frahim, et al., "Cisco ASA: All-in-One Firewall, IPS, and VPN Adaptive Security Appliance," Cisco Press 2006, first printed Oct. 2005, 54 pages.
Nichols, et al., "Definition of the Differentiated Services Field (DS Field) in the IPv4 and IPv6 Headers," Network Working Group RFC 2474, Dec. 1998, 20 pages.
Perkins, "IP Encapsulation with IP," Network Working Group RFC 2003, Oct. 1996, 14 pages.
Sourcefire 3D System User Guide, Version 4.10, Mar. 16, 2011, 2123 pages.
Ylonen, et al., "The Secure Shell (SSH) Transport Layer Protocol," SSH Communication Security Corp, Network Working Group RFC 4253, Jan. 2006, 32 pages.
Dec. 7, 2021—(WO) International Search Report and Written Opinion—App PCT/US2021/047735.
Anonymous: "Port forwarding—Wikipedia," pp. 105, retrieved from <<https://en.wikipedia.org/w/index.php?title=Port_forwarding&oldid=728958979>>, Jul. 8, 2016.
Fielding, R., et al., "Hypertext Transfer Protocol (HTTP/1.1): Message Syntax and Routing; rfc7230.txt", pp. 1-89, Jun. 7, 2014.
Moravcik Marek, et al., "Teaching Cloud Computing in Cloud Computing," 2017 15th International Conference on Emerging Elearning Technologies and Applications (ICETA), IEEE, Oct. 26, 2017, pp. 1-6.
Amazon Virtual Private Cloud User Guide, Jun. 15, 2022, 362 pages.
West, "Announcing AWS Managed Rules for AWS WAF," AWS WAF, Launch, News, Security, Identity, & Compliance, AWS News Blog, Nov. 25, 2019, 8 pages.
Stuhlmuller, "Aviatrix builds on existing AWS relationship, with Service Ready solutions for the new AWS Gateway Load Balancer (GWLB)," Aviatrix Blog, Nov. 10, 2020, 4 pages.
Kelley, AWS Gateway Load Balancer Enhances Netscout Visibility in AWS, Netscout Blog, Nov. 10, 2020, 4 pages.

(56) References Cited

OTHER PUBLICATIONS

Barr, "AWS PrivateLink Update—VPC Endpoints for Your Own Applications & Services," AWS News Blog, Nov. 28, 2017, 6 pages.
Maresky, "Check Point CloudGuard integrates with AWS Gateway Load Balancer at Launch," CloudGuard Product Marketing Manager, published Nov. 10, 2020, 12 pages.
Kotamraju, "Cisco Cloud ACI & AWS continued journey in the cloud," CISCO Blogs, Nov. 10, 2020, 10 pages.
Barr, "New—Client IP Address Preservation for AWS Global Accelerator," AWS News Blog, Aug. 28, 2019, 7 pages.
Amitai, "Deploy and Scale DDoS Protection in the Public Cloud," Radware Blog, Nov. 10, 2020, 2 pages.
Elastic Load Balancing, Gateway Load Balancers, AWS, Nov. 10, 2020, 44 pages.
Tang, "Secure Your Cloud Workloads Against Exfiltration—Getting Started with Valtix using AWS Gateway Load Balancer," Nov. 10, 2020, 10 pages.
Sundarraj, Highly Scalable FortiGate Next Generation Firewall Security on AWS Gateway Load Balancer Service, Nov. 10, 2020, 8 pages.
Yun, "Introducing AWS Gateway Load Balancer—Easy Deployment, Scalability, and High Availability for Partner Appliances," AWS News Blog, Nov. 10, 2020, 7 pages.
Stormacq, "Learn From Your VPC Flow Logs With Additional Meta-Data," AWS News Blog, Sep. 11, 2019, 4 pages.
Trend Micro Integrates with AWS Gateway Load Balancer for Improved Security Function, Trend™ MICRO2020, PR Newswire, Nov. 10, 4 pages.
Gupta, "VM-Series Virtual Firewalls Integrate With AWS Gateway Load Balancer," paloalto® Networks Blog, Nov. 10, 2020, 2 pages.
Stormacq, "New—VPC Ingress Routing—Simplifying Integration of Third-Party Appliances," AWS News Blog, Dec. 3, 2019, 8 pages.
Barr, "New—VPC Traffic Mirroring—Capture & Inspect Network Traffic," AWS News Blog, Jun. 25, 2019, 10 pages.
Kunze, "Bringing Glasnostic's Traffic Control to AWS Gateway Load Balancer," Glasnostic, Nov. 10, 2020, 9 pages.

\* cited by examiner

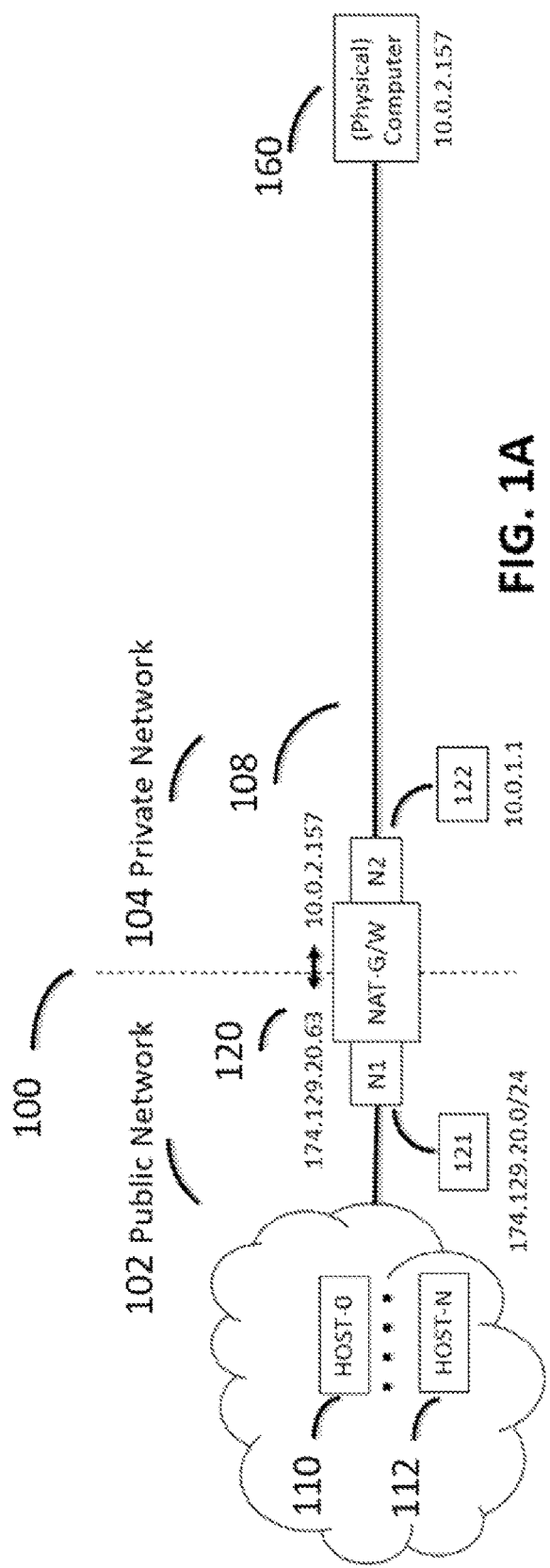
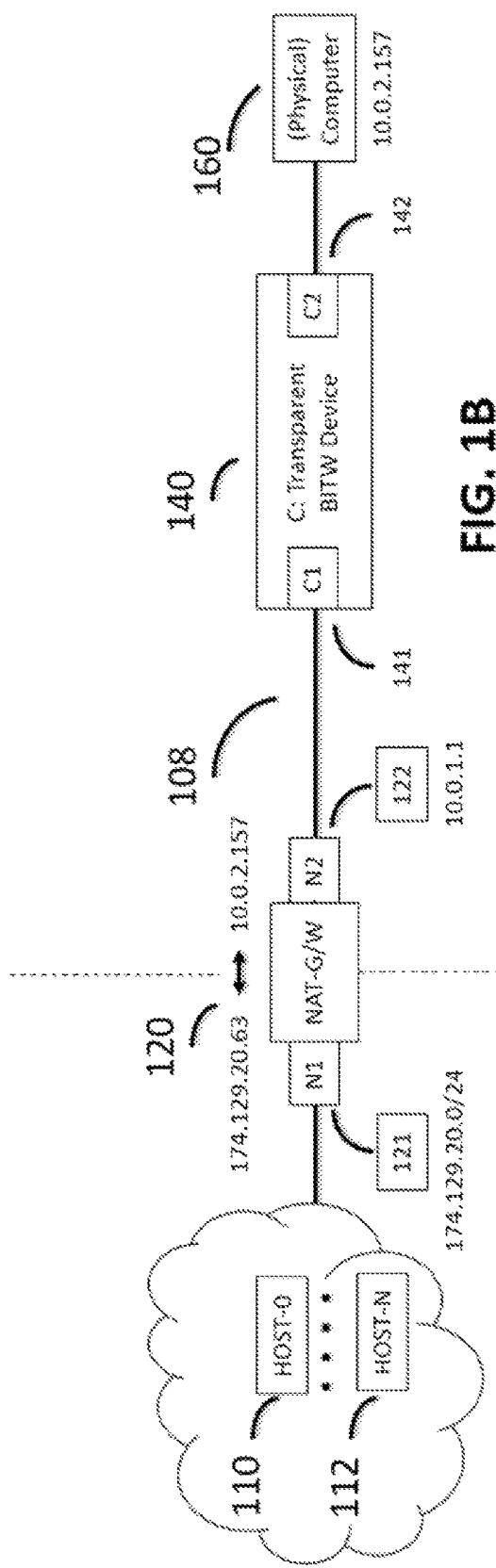
FIG. 1A
FIG. 1B

METHODS AND SYSTEMS FOR EFFICIENT VIRTUALIZATION OF INLINE TRANSPARENT COMPUTER NETWORKING DEVICES

CROSS-REFERENCE TO RELATED APPLICATIONS

The present application is a continuation of U.S. patent Ser. No. 18/102,378, filed Jan. 27, 2023, which is a continuation of U.S. patent application Ser. No. 17/698,164, filed Mar. 18, 2022 and issued as U.S. Pat. No. 11,570,138, which is a continuation of U.S. patent application Ser. No. 17/395,120, filed Aug. 5, 2021 and issued as U.S. Pat. No. 11,316,823, which claims priority to U.S. Provisional Patent Application Ser. No. 63/071,174, filed Aug. 27, 2020, each of which is hereby incorporated by reference in its entirety.

BACKGROUND

Transmission Control Protocol/Internet Protocol (TCP/IP) networks, such as the public Internet, are the basis for the modern information age. The TCP/IP protocol suite enables data communications between endpoint host computers by specifying how data should be packetized, addressed, transmitted, routed, and received. The TCP/IP protocol suite consists of five layers: the physical layer (Layer 1, or L1), the data link layer (L2), the network layer (L3), the transport layer (L4), and the application layer. Of particular relevance to the present disclosure are the Layer 3 (L3) protocols, (e.g., Internet Protocol (IP), such as IPv4 and IPv6), which are used by network nodes/hosts such as routers to efficiently direct packets to their destinations (e.g., endpoints/host computers), as well as the Layer 2 (L2) link-layer protocols (e.g., Ethernet 802.3, Media Access Control (MAC) addressing, Address Resolution Protocol (ARP), Neighbor Discovery Protocol (NDP), etc.), which are used to efficiently transmit packets across the links connecting network nodes/hosts.

Many organizations operate private TCP/IP networks to support their business operations and to provide computer services and resources to other networked organizations and consumers. These private networks are interconnected by the Internet, which enables different organizations to access each other's computer services and resources. These computers are addressed by, or identified by, IP addresses that are elements of the Internet's public IP address space/set. Private networks are often operated/administrated autonomously from the Internet and use a private IP address space/set that is distinct from the Internet's public IP address space/set, i.e., the intersection is the empty set. Thus, if an organization operating a private network wants its computers/hosts to access or be accessed by Internet hosts, then the organization needs to operate a network address translation (NAT) gateway located at the boundary between the private network and the Internet. The NAT gateway functions as an interface between the Internet IP address space and the private network's IP address space, i.e., the NAT gateway translates between Internet IP addresses and the private network's IP addresses. Thus, if an organization wants to make a host computer connected to its private network accessible/addressable from the Internet, for example a company web site, then the host computer must be associated with both a private IP address and a public IP address. The NAT gateway is configured to translate between the host computer's private IP address and its public IP address. These associations may be static and permanent or dynamic and ephemeral.

FIG. 1A illustrates an example of a network environment 100 where a (physical, or non-virtual) private network 104 operated/administrated by an enterprise interfaces with a public network 102 (e.g., the Internet). The enterprise may assign private IP addresses, for example from the IPv4 private address space 10.0.0.0/8, to the network interfaces of its host computers, routers, and/or other devices. An internal routing protocol (e.g., Open Shortest Path First (OSPF)) may be used by the enterprise to define a routing policy that determines a network path 108 between any two private IP addresses associated with the private network 104. The enterprise may interface its private network (which may use a private IP address space) with the Internet (which may use a public IP address space) via a network address translation (NAT) gateway (NAT-G/W) 120. The NAT gateway function may be included in one or more network edge devices such as network firewalls and edge routers, which are not shown in the diagram. The NAT-G/W 120 may translate public Internet IP addresses assigned to the enterprise to private IP addresses. This way, internal hosts connected to the private network may be able to communicate with Internet hosts, and vice versa. For example, the enterprise's Internet Service Provider (ISP) may provision a public Internet (IPv4) address block (e.g., 174.129.20.0/24) to the enterprise. The enterprise may assign, for example, the address block 174.129.20.0/24 to an Internet-facing network interface N1 121 of its NAT-G/W 120 and, for example, the private IP address 10.0.1.1 to a private network-facing network interface N2 122 of NAT-G/W 120.

The enterprise may also configure NAT-G/W 120 to map a public IP address (e.g., 174.129.20.63) to a private IP address (e.g., 10.0.2.157) assigned to a (physical, or non-virtual) computer 160. Thus, computer 160's public IP address in this example would be 174.129.20.63. The routing policy and associated configuration for the private network 104 may determine the path 108 through the private network 104 for packets sourced by or destined for computer 160 that pass through the NAT-G/W 120 (i.e., packets destined for or sourced by Internet hosts). Path 108 may be, for example, a single physical link/cable connecting a network interface of NAT-G/W 120 to a network interface of computer 160 or, for example, multiple physical links connecting one or more routers and/or switches (nodes) that are on the network path. With this configuration, for example, a computer HOST-0 110 connected to the public network 102 may communicate bi-directionally with computer 160 connected to the private network 104 via transmission of L3/IP packets through the Internet with 174.129.20.63 as the source or destination IP address.

The enterprise may deploy intermediary devices that are inserted inline into physical links (e.g., copper and optical cables) connecting network interfaces of network nodes (e.g., routers, switches, host computers, etc.) and that may inspect and process in-transit packets in accordance with the packets' contents and/or with the application logic of the intermediary device. As such, these devices may be referred to as in-transit packet-processing devices. These intermediary packet-processing devices may enforce data communications policies (e.g., network security policies, network access control policies, network application usage policies, network address translation policies, etc.) as defined by the owner/operator/administrator (e.g., the enterprise) of the private network. In order to enforce the policies on particular communications, the network administrator may coordinate the locations of the intermediary packet-processing devices (e.g., determine into which links the intermediary packet-processing devices are to be inserted), the network configurations, and/or the routing policies such that the particular communications' packets always pass through (in one or both directions) the intermediary packet-processing devices. Because these policies may be applied to communications between internal hosts (connected to the private network, e.g. computer 160) and public network (e.g., Internet) hosts, the devices may be located at or near the boundaries between the private network and the public network, for example, the devices may be inserted into public network access links. Examples of these devices include network firewalls, network access controllers, web proxies, TLS proxies, packet security gateways, threat intelligence gateways, IPsec gateways, and the like. Similarly, the devices may be located between the boundaries of any different networks (for example, not just limited to between a private network and a public network) and/or between the boundaries of subnets and/or segments within a network, e.g., at concentrations points and load distribution points.

Referring to FIG. 1B: When configuring an intermediary packet-processing network device C 140 for inline operation/insertion in a link on a path 108 between two network elements A (e.g., NAT-G/W 120) and B (e.g., computer 160), a physical link (e.g., a copper or optical cable, and/or a physical wireless connection) that may compose all or a portion of path 108 may be physically segmented into two links, with one link connecting a network interface port of element A with a network interface port C1 141 of the device C 140, and with the other link connecting a network interface port of element B with a network interface port C2 142 of the device C 140. Network interfaces C1 and C2 of device C may be connected by an internal logical link defined by the device's application logic (e.g., packet filtering and/or associated policy enforcement logic). For example, an in-transit packet that ingresses C1 (or C2) may be processed by device C's application logic and then, provided that the logic decides not to drop the packet, the packet may egress device C via C2 (or C1).

In some scenarios, the network devices' network interfaces may have L3/network-layer (e.g., IPv4) and L2/link-layer (e.g., MAC) addresses associated with them. In such examples, the interfaces and devices are described as being non-transparent. Non-transparent devices may have interfaces that may be addressed directly and may participate in determining (L3) routing policy and configurations via routing protocols (e.g., OSPF) and (L2) switching & forwarding and link-layer discovery protocols (e.g., ARP, NDP). With regard to enforcing communications policies, for example, to enforce web usage and web security policies, the enterprise may configure its networks (e.g., private network 104), devices, and applications such that certain (or all) outbound web (i.e., HTTP/HTTPS) traffic must be routed through a non-transparent web proxy, and/or that the network firewall only allows outbound web traffic from the non-transparent web proxy. Such a configuration may involve the web proxy's network interfaces being assigned/identified with (L3) IP addresses. More generally, when network administrators define network communications policies that require that particular communications route through packet processing devices with IP-addressable network interfaces, the administrators must ensure that the network and routing policy/routing tables are properly configured to satisfy the requirement. Changes to the network and/or the routing policy may potentially cause changes in the routing such that the requirement is not satisfied; thus, when making such changes, administrators may need to take actions to ensure such requirements are still satisfied.

In other scenarios, the network devices may not have L3/network-layer (e.g., IPv4, IPv6) and L2/link-layer (e.g., MAC) addresses associated with them. This configuration may be used in, e.g., inline network devices that process in-transit packets, for example, packet-filtering devices. In such examples, the interfaces and devices are described as being (L3- and L2-) transparent, because the devices cannot be "seen" or observed by other network elements and protocols operating at L3 or L2. Skilled artisans may refer to such a transparent inline device as a "bump in the wire" (BITW), one reason being that frames/packets transiting through a BITW device are not modified at L2 or L3 (e.g., there are no changes made to MAC addresses or IP addresses or other header fields), and often are not modified at any layer.

There are multiple potential advantages and potential efficiencies resulting from this transparency configuration of a BITW device. For example, performance (as measured by the device's packet throughput) may be improved for multiple reasons. One reason is that egressing frames/packets may not need to access routing and forwarding tables, for example via a call to the operating system (OS) kernel, to determine, for example, the destination MAC address for the L2 frame. Another reason is that non-transparent packet-processing devices may use the relatively slow TCP/IP networking stack logic provided by the devices' OS (e.g., Linux) kernel to process in-transit packets and participate in L3 routing and L2 switching/forwarding protocols; whereas, transparent devices may bypass the OS kernel's TCP/IP networking stack and use much faster packet processing logic that directly accesses the network interface controllers (NICs), for example, the Data Plane Development Kit (DPDK). Fast packet processing logic modules such as DPDK may not natively support functions that alter L3/IP packet headers (e.g., proxy functions that change packets' source or destination IP address values) or L2/Ethernet frames (e.g., link forwarding functions that change source or destination MAC address values). If such functions are needed for a particular application, then the application may access them via, for example, calls to the OS' TCP/IP networking stack; however, this approach may affect the application's packet processing performance.

Skilled artisans often refer to an OS bypass architecture/implementation as a "fast path" (vs. the "slow path" through the OS kernel) and may assume that the associated BITW device adds minimal latency and does not drop packets (because of, for example, buffer overflows resulting from large latencies). As with non-transparent devices, when network administrators define network communications policies that require that particular communications transit through such transparent devices, then the administrators must ensure that the network and routing policy are properly configured to satisfy the requirement. But, because the transparent devices' network interfaces do not have IP addresses, administrators cannot use routing policy to direct particular packets to the interfaces, but instead must use indirect methods to ensure that requirements are met. Accordingly, and similar to the non-transparent device case, changes to the network and/or the routing policy may potentially cause changes in the routing such that the requirement is not satisfied; thus, when making such changes, administrators may need to take actions to ensure such requirements are still satisfied, which may be more difficult to effect than the non-transparent case (because, for example, only indirect vs. direct routing methods can be used).

The efficiencies of cloud computing platforms and services (e.g., Amazon Web Services, Microsoft Azure, Google Cloud, etc.) have caused many organizations to migrate, or virtualize, portions of their physical private networks into virtual private clouds. When provisioning inline network devices, for example inline packet-filtering devices, in a virtual private cloud environment using a service such as Amazon Virtual Private Cloud (VPC), the devices' network interfaces must be assigned (private) IP addresses, and the devices' network interfaces can no longer be transparent. Whereas a connection to a physical device's network interface port may be made with a physical connection, for example, an Ethernet cable, no such physical connection is possible in a virtual environment. When mapping such physical connections to a virtual cloud environment, the connections must be emulated/virtualized via L3 routing and the associated routing policy.

FIG. 2A illustrates an example network environment 200 where a virtual private cloud 204—which has, for example, been configured by an enterprise on top of an Infrastructure-as-a-Service (IaaS) platform, which may be hosted by the enterprise itself or hosted by an IaaS provider (e.g., Amazon, Microsoft, Google, etc.)—interfaces to the public network 102. Virtual private cloud 204 may be a virtualized version of physical private network 104 in FIG. 1A. A virtual NAT-G/W 220 function, which may be supplied/provisioned by the IaaS platform, may map public addresses (e.g., Internet addresses), for example 174.129.20.63, to private IP addresses of virtual computers, such as 10.0.2.157 for virtual computer 260.

The routing protocol and associated routing policy may also determine the network path between virtual NAT-G/W 220 and virtual computer 260, which is represented in FIG. 2A by virtual path 208. The routing protocols and policies for the virtual private cloud may be administered by the IaaS platform supplier, for example an IaaS provider, and not necessarily by the platform subscriber (e.g., the enterprise). Routing protocols and policies may differ between different IaaS providers; furthermore, IaaS providers may not expose the control of the routing protocols and policies to the subscribers/enterprises that use the IaaS providers' virtual private cloud platforms. Thus, for example, if an enterprise requires that particular packets traverse a particular path or subpath or link through a virtual private cloud, then the enterprise must configure the IP addresses of the cloud's elements and configure the private cloud in such a way that a particular path will be traversed by particular packets, for example, by configuring subnets and by modifying the cloud's route tables (which IaaS providers expose). Because the enterprise may not control the routing policy, ensuring that such requirements are met may be difficult and problematic, especially when the private cloud is dynamic, e.g., when changes are frequently made to the private cloud that modify the routing configurations (which may be likely because one of the potential advantages of clouds is that changes to the network, for example dynamically adding or removing servers because of dynamic changes in loading, may be much more efficient to implement compared to physical networks).

SUMMARY

The following several paragraphs present a simplified summary in order to provide a basic understanding of some aspects of the disclosure. They are intended neither to identify key or critical elements of the disclosure nor to delineate the scope of the disclosure. The following several paragraphs merely present some concepts of the disclosure in a simplified form as a prelude to the description below.

In view of the Background discussion above, there is a need for methods, systems, and logic that support virtualization of transparent physical BITW network devices and/or provisioning of the devices into dynamic virtual private cloud environments. There is further a need for this to be done in a way that may (a) preserve fast path packet processing and associated packet-throughput performance, (b) enforce policies for ensuring that packets comprising particular/specified communications traverse virtual paths that pass through the virtualized BITW devices, and/or (c) be invariant to differences in routing policies across different virtual private cloud platforms.

Aspects described herein generally relate to computer hardware and software for TCP/IP networking, and related methods thereof. For example, one or more non-limiting aspects of the disclosure generally relate to networking devices that mediate packetized data transmission in a computer network.

For example, methods, devices, systems, and/or computer-readable media disclosed herein describe examples of logic and configurations that may support (1a) efficient virtualization of inline transparent physical in-transit packet-processing network devices and/or (1b) efficient deployment into a virtual private cloud environment; and/or that may (2a) preserve the devices' packet-processing performance and/or (2b) enforce enterprise communications policies that some or all packets comprising communications between one or more Internet hosts and one or more virtual hosts connected to the virtual private cloud traverse a virtual path that includes a virtual link between a virtual bump-in-the-wire (BITW) device's network interfaces. These properties and characteristics may be invariant to differences or changes in routing policies that may occur across different virtual private cloud platforms. As a matter of convenience, the term "Virtual BITW device" may be used herein to label virtualized versions of physical BITW devices, e.g., inline transparent in-transit fast-path packet-processing physical network devices that have been virtualized and deployed into a cloud.

When virtualized and provisioned into the cloud, these virtual BITW devices' network interfaces may be assigned (L3) private IP addresses and (L2) MAC addresses that are associated with the devices' efficient Network Address Mapper (NAM) logic and the cloud's routing tables to effect desired L3 proxy functions and L3/L2 routing and forwarding functions. The virtualized devices may process in-transit packets using the same or similar fast path packet processing (FPPP) logic (e.g., Data Plane Development Kit (DPDK)) used by the physical versions of the BITW devices while bypassing the slow path operating system's TCP/IP networking stack logic.

A virtual host computer connected to a virtual private cloud may be identified by its (private) IP address and may be associated with a policy that certain, or all, in-transit packets comprising communications between the virtual host computer and Internet hosts must pass through a virtual BITW device deployed into a virtual path in the cloud between the virtual host computer and the cloud's Internet interface, for example, a network address translation (NAT) gateway. The IP addresses and associated subnets of the virtual BITW device, virtual host computer, and NAT gateway may be configured such that communications between the Internet and the virtual host computer traverse the virtual path and pass through the virtual BITW device. An Internet-facing network interface of the virtual BITW device may be identified as an IP address proxy for the virtual host computer. A NAT gateway that interfaces the Internet with the private cloud and that natively translates between the virtual host computer's Internet address and its private IP address may be re-configured to translate the virtual host computer's Internet address to the proxy address. Packets sourced by an Internet host and destined for the virtual host computer may be routed (by the cloud) from the NAT gateway to the proxy network interface of the virtual BITW device. After receiving a packet at the proxy interface, the device's NAM logic may modify the packet's L3 destination address and L2 MAC addresses so that, after the device processes the packet through the fast-path logic and forwards the packet out the device's virtual host-facing network interface, the packet is routed to the virtual host computer. Similarly, packets sourced by the virtual host computer and destined for an Internet host may be routed to and received by the device's virtual host-facing network interface, modified by the NAM logic, processed through the device's fast path logic, forwarded out the proxy interface, and routed to the NAT gateway, which may perform an address translation and forward the packet towards the Internet host.

Further aspects disclosed herein are directed to configuring a virtual BITW device to process packets through a fast path of the virtual BITW device.

Further aspects disclosed herein are directed to configuring a proxy, an address, a subnet, and/or a routing table of a virtual BITW device to ensure that packets traverse a virtual path through a cloud, wherein the virtual path comprises a fast path through the virtual BITW device.

Further aspects disclosed herein are directed to provisioning a virtual BITW device into a virtual path; assigning IP addresses to network interfaces corresponding to subnets of virtual path terminals; configuring NAM logic (1) with IP and/or MAC addresses of terminals and/or interfaces, and/or (2) with proxy information; configuring a NAT gateway to translate at least one public IP address to a private IP address associated with the virtual BITW device; and providing at least one cloud routing table configured to enforce outbound virtual path routing through the virtual BITW device and the NAT gateway.

There are many possible variants and extensions to the above aspects, including for example the case of multiple virtual host computers, some of which are detailed below by way of example.

Features of the disclosure will become more apparent upon a review of this disclosure in its entirety, including the drawings provided herewith.

BRIEF DESCRIPTION OF THE DRAWINGS

Some features herein are illustrated by way of example, and not by way of limitation, in the figures of the accompanying drawings, in which like reference numerals refer to similar elements, and wherein:

FIGS. 1A and 1B depict illustrative network environments for physical private networks including physical inline BITW devices;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the disclosure. In addition, reference is made to particular applications, protocols, and embodiments in which aspects of the disclosure may be practiced. It is to be understood that other applications, protocols, and embodiments may be utilized, and structural and functional modifications may be made, without departing from the scope of the disclosure. It is to be understood that although the descriptions, figures, and examples reference the IPv4 protocol, the IPv6 protocol and other protocols may be similarly referenced.

Various connections between elements are discussed in the following description. These connections are general and, unless specified otherwise, may be direct or indirect, wired or wireless, physical or logical (e.g., virtual or software-defined), in any combination. In this respect, the specification is not intended to be limiting.

Figure 2A:
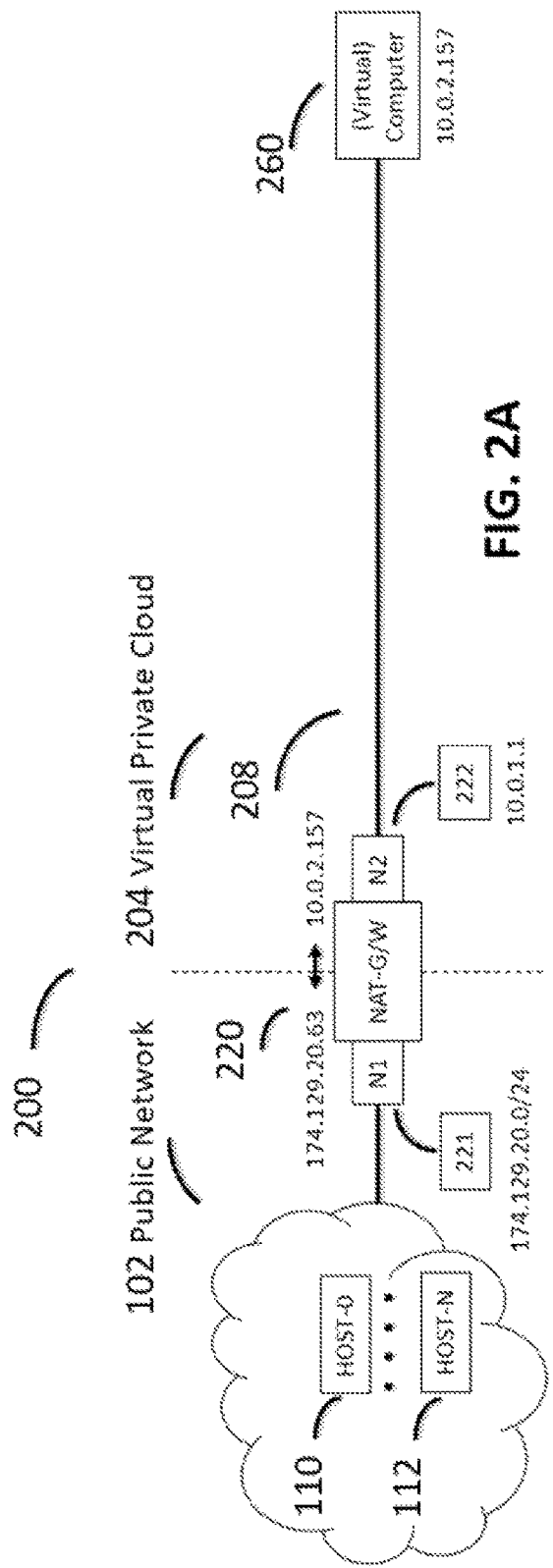
FIGS. 2A and 2B depict illustrative network environments for virtual private clouds including virtual BITW devices.
Figure 2B:
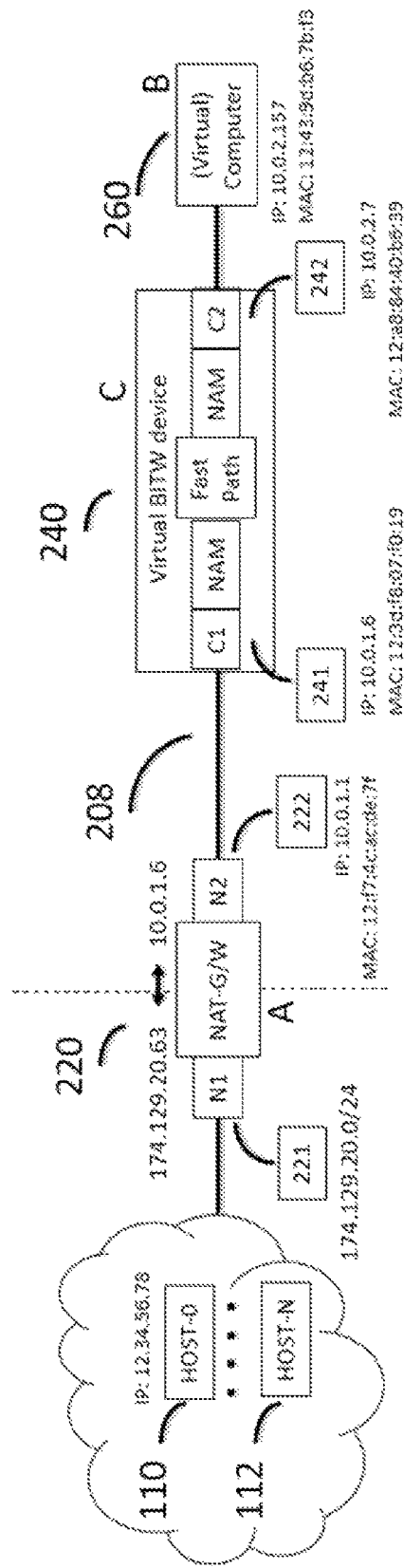

As shown in FIG. 2B, when a subscribing enterprise, or other entity such as a private cloud operator, inserts a virtualized version of a physical BITW device C 240 (a virtual BITW) in the virtual path 208 in order to process in-transit packets, device C's network interfaces C1 241 and C2 242 may have (L3) IP addresses assigned to them so that the underlying private cloud platform not only recognizes the device but also can potentially route packets through the device. However, if the enterprise defines a policy that, for example, requires that all packets comprising communications between computer 260 and any Internet hosts pass through device C 240, the enterprise may not be able to directly enforce the policy because it may not control the routing. For example, the routing protocol may decide that the best path (not shown in FIG. 2B) between NAT-G/W 220 and computer 260 does not pass through device C 240. The enterprise may take measures to possibly guide the routing protocol to route particular packets through device C 240; for example, the enterprise may require that interface C1's and interface C2's respective IP addresses be associated with different, non-overlapping subnets to increase the likelihood of the desired routing. For example, in FIG. 2B, interface C1 may be assigned 10.0.1.6 in subnet 10.0.1.0/24, whereas interface C2 may be assigned 10.0.2.7 in subnet 10.0.2.0/24, which does not overlap with interface C1's associated subnet. Such actions, however, do not guarantee the desired routing, because there may be, for example, a path (not shown in FIG. 2B) between subnet 10.0.1.0/24 and subnet 10.0.2.0/24 that bypasses device C or, for example, the routing may cause packets to route in the wrong direction through device C. Furthermore, even when the routing through device C 240 appears to be working as desired/ required, any further changes to the network, e.g. adding, removing, and/or modifying servers, subnets, IP addresses, etc., may cause a reconfiguration of the routing such that the routing of packets through device C 240 no longer meets the enterprise's desired requirements.

One approach to supporting IP address and MAC address assignment to network interfaces of (transparent physical) BITW network devices—so that the devices may be virtualized and provisioned into IaaS providers' virtual private clouds and may participate in L3 routing and L2 forwarding—is to revert to using the device OS's (slow path) TCP/IP network stack logic to process in-transit packets and to configure/determine routing and forwarding information. Thus, the packet-throughput performance gains enabled by transparency and associated fast path packet processing logic in a physical BITW device may be sacrificed to support virtualization of the device. Using the OS's TCP/IP network stack logic, however, may cause local routing and forwarding information to be automatically configured by the cloud platform's routing and switching protocols; but, as noted above, this does not necessarily enforce any packet routing policies/requirements for the cloud and may cause further performance reductions.

As will be described below, the following correlated components may be provided in support of a virtual BITW: (1) a cloud configuration component that may coordinate addressing (e.g., IP and MAC addressing), address translation, proxying, subnetting, and/or routing; and (2) a Network Address Mapper (NAM) logic component that may be inserted (e.g., shimmed) in the Virtual BITW device system such as between the FPPP's network interface controller (NIC) drivers and the FPPP's core packet processing logic that may efficiently map L3/IP addresses and L2/MAC addresses of ingressing and/or egressing L3/L2 packets/frames to values that may cause them to be routed/forwarded to intended destinations along a virtual path.

Figure 3:
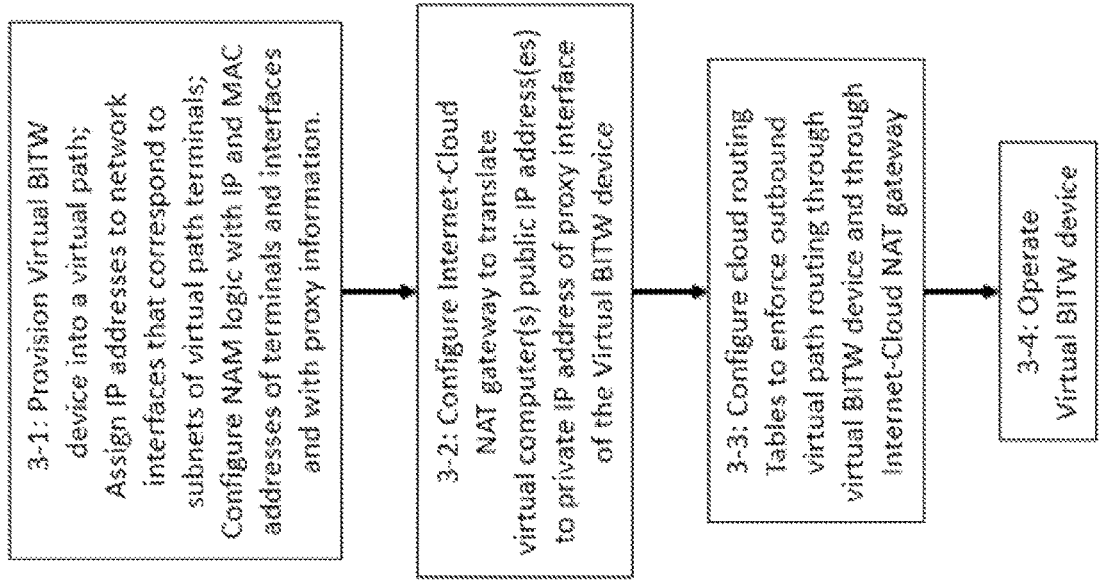
FIG. 3 shows an example block diagram of a process of provisioning, configuring, and operating a virtual BITW device in a private cloud.

Referring to FIG. 3, consider first an example cloud configuration component that may be comprised of any of the following interrelated subcomponents:

Configuring the virtual BITW device and associated subnets into a virtual path;
Configuring the NAT gateway and associated proxying; and
Configuring cloud route tables.

Note that the configuration of the subcomponents may be performed in the context of and in coordination with the private cloud provider's infrastructure, which may automatically and/or transparently perform functions such as routing and route table generation, MAC address generation and assignment, etc., the operations of which are not shown or described. Note also that the described examples/scenarios are for the simple case of an inline virtual BITW device 240 intermediating between a single virtual host computer (e.g., computer 260), a single Internet gateway (e.g. NAT-G/W 220), and a single Internet host (e.g., HOST-0 110). The methods and systems of the disclosure described herein are readily extended by skilled artisans to more complex scenarios with multiple virtual hosts, Internet hosts, gateways, and virtual BITW devices.

In FIG. 2A, which represents an example environment before a virtual BITW device has been deployed, the NAT-G/W 220 may be configured to translate between public IP addresses associated with public network 102 (e.g., the public Internet) and private IP addresses associated with a virtual private cloud 204. For example, virtual computer 260 may be associated with the public IP address 174.129.20.63 and with the private IP address 10.0.2.157. Thus, in FIG. 2A, NAT-G/W 220 is depicted as translating 174.129.20.63 to/from 10.0.2.157. The cloud platform provider's (e.g., IaaS provider's) routing system may determine a (bi-directional) path 208 through the virtual private cloud 104 between network interface N2 222 (with IP address 10.0.1.1) of the NAT-G/W 220 and Computer 260 (with IP address 10.0.2.157). The IP addresses 10.0.1.1 and 10.0.2.157 and associated network interfaces represent the terminals of path 208.

Referring to FIG. 3, in Step 3-1, the virtual BITW device may be provisioned, configured, and deployed into a virtual path. Each terminal of the virtual path may be exclusively associated with a subnet and with a network interface of the virtual BITW device. Each such network interface of the virtual BITW device may be assigned an IP address that is in the same subnet as its associated path terminal. The virtual BITW device's NAM logic may be configured with IP addresses and MAC addresses of the virtual path's terminals and of the device's network interfaces. The NAM logic may be configured with information to map packets received by the virtual BITW device's proxy interface to the virtual host computer(s), or virtual path terminal(s), that are being proxied.

For example, referring to FIG. 2B, when deploying a virtual BITW device C 240 inline into path 208, the network interface C1 241 may be configured with an IP address, for example 10.0.1.6, that is in the same subnet, for example a /24 subnet, as NAT-G/W 220's network interface N2 222, which has an IP address 10.0.1.1, and which is one terminal of path 208. C2 241 may be designated as the proxy interface, i.e., C1 241 with IP address 10.0.1.6 may serve as the IP address proxy for virtual computer 260 (with IP address 10.0.2.157). As a matter of convenience, virtual host computer(s) that are being proxied by a virtual BITW device's network interface may be referred to as "target(s)". The NAM logic may be configured with this proxy information, which may be used by the NAM logic to map/modify in-transit L3 packets' IP address field values of 10.0.1.6 to 10.0.2.157. Concurrently, the network interface C2 242 may be configured with an IP address, for example 10.0.2.7, that is in the same subnet, for example a /24 subnet, as target virtual computer 260 (with IP address 10.0.2.157, the other terminal of path 208), but where the subnet containing C2 is different than and non-overlapping with the subnet containing C1. After the network interfaces have been assigned IP addresses, the cloud platform may generate and assign MAC addresses to the interfaces, and update the cloud's routing tables (using, for example, OSPF and ARP) to incorporate/integrate the newly deployed virtual BITW device 240 into the cloud's routing configuration. The cloud platform may create and maintain routing tables associated with each network interface in the cloud, which may determine routes between the network interfaces. After the routing tables have been updated, the NAM logic may extract from the routing tables and networking stack any of the following information: the IP and MAC address of the target virtual computer 260; the IP and MAC address of the C1 241 interface (e.g., the proxy for the target virtual computer 260); and/or the MAC address of the NAT-G/W 220 gateway's network interface that is in the same subnet as C1 241. As described further below, this information may be used by the NAM logic to help ensure that certain (or all) packets comprising communications between Internet hosts and target virtual computer 260 pass through the virtual BITW device 240. This information also may be used to efficiently access routing and forwarding information in accordance with fast-path packet processing, which otherwise may be accessed via the slow-path (i.e., the OS's TCP/IP networking stack).

Referring to FIG. 3, in Step 3-2, the NAT gateway that interfaces the private cloud 204 with the public network 102 by translating between the public (e.g., Internet) IP addresses and private (e.g., cloud) IP addresses of virtual host computers may be re-configured to translate the target virtual host computers' public IP addresses to the private IP address of the proxy interface of the virtual BITW device.

For example, referring to FIG. 2B, the NAT-G/W 220 may be configured to translate 174.129.20.63, the public IP address of computer 260, to 10.0.1.6, the private IP address of C1 241 instead of 10.0.2.157, the private IP address of target computer 260. In effect, the NAT-G/W 220 has designated network interface C1 as the proxy for target computer 260 (and, as explained above, the virtual BITW's NAM logic may be configured similarly).

Referring to FIG. 3, in Step 3-3, the cloud platform's route tables may be modified/configured/augmented such that outbound packets traversing the virtual path between the path's terminals, for example, packets sourced/originated by a terminal virtual computer and destined for an Internet host (or other public network host) via the NAT gateway, may be routed from a terminal virtual computer to the non-proxy network interface of the virtual BITW device, and then from the proxy network interface of the virtual BITW device to the NAT gateway that interfaces the private cloud with the public network. Specifically, the route tables may be modified such that: (1) outbound packets leaving the subnet associated with both the terminal virtual computer and the non-proxy interface of the virtual BITW device are directed/forwarded towards the non-proxy interface; and/or (2) outbound packets leaving the subnet associated with both the proxy interface of the virtual BITW and the NAT gateway interface are directed/forwarded towards the NAT gateway interface.

For example, referring to FIG. 2B, the augmentations to the cloud's route tables may include (1) an entry that identifies the NAT-G/W 220's N2 222 interface, which has IP address 10.0.1.1, as the Internet gateway for all outbound packets exiting the subnet 10.0.1.0/24. Note that (1a) this subnet 10.0.1.0/24 includes the C1 241 proxy interface of the virtual BITW device 240, and that (1b) N2 222 is a terminal of virtual path 208. Thus, this entry may help enforce the requirements associated with traversal of virtual path 208. The augmentations to the cloud's route tables may further include (2) an entry in the route table for the C2 242 interface that identifies the C2 242 interface, which has IP address 10.0.2.7, as the egress point for all outbound packets exiting the subnet 10.0.2.0/24. Note that (2a) this subnet 10.0.2.0/24 includes the target virtual computer 260 (which has IP address 10.0.2.157) and that (2b) virtual computer 260 is a terminal of virtual path 208. Thus, this entry may also help enforce the requirements associated with traversal of virtual path 208.

Upon completion of Steps 3-1, 3-2, and 3-3, the virtual BITW device may be ready for operation in its virtual path; thus in Step 3-4, the virtual BITW may be transitioned into operation.

Note that the ordering of Steps 3-1, 3-2, and 3-3 and associated substeps is exemplary and may be different in practice. Moreover, any of these steps may be combined and/or further subdivided.

Figure 4:
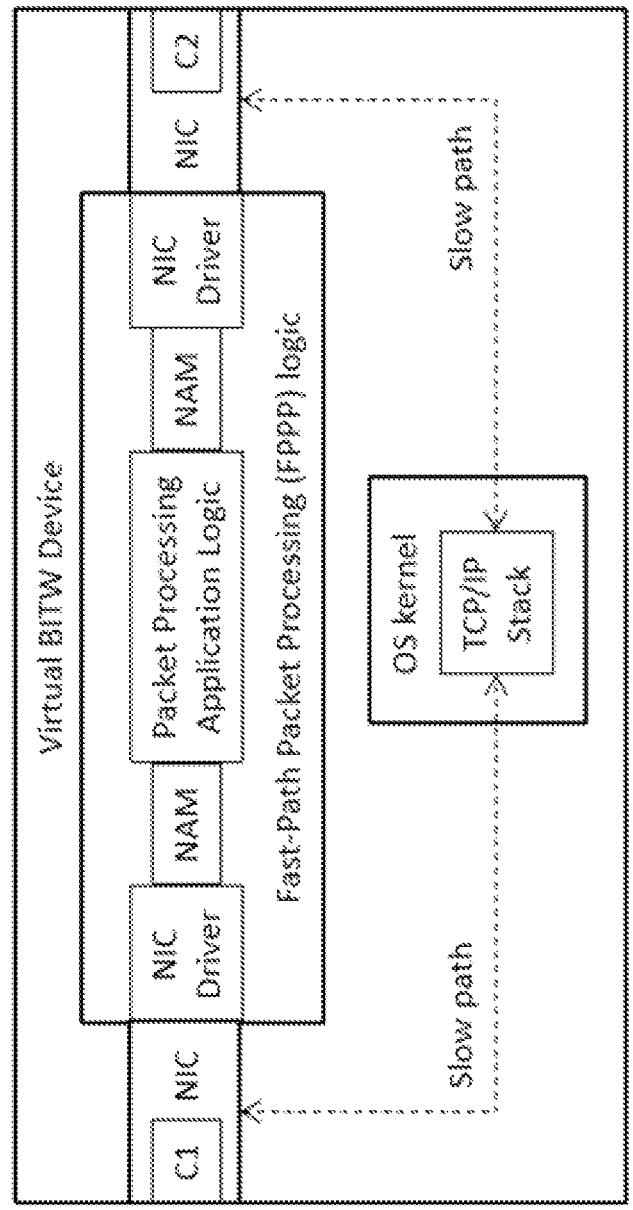
FIG. 4 shows an example architecture of a virtual BITW device.

Referring to FIG. 4, which represents an example of the virtual BITW device's logic architecture as a pipeline, consider next the NAM logic component. The NAM may be inserted between the FPPP's network interface controller (NIC) drivers and the fast path packet processing (FPPP) application logic, where the application may be, for example, network firewalling, network access control, web proxy, TLS proxy, packet security gateway, threat intelligence gateway, IPsec gateway, and/or the like. A purpose of the NAM may be explained in terms of why it may be used in a virtual BITW device but not by a physical BITW device. For example, a version of FIG. 4 for a physical BITW device may differ from FIG. 4 (for the virtual BITW) at least by the NAM logic component.

The NAM component may provide one or more functions. Examples of these functions may include:

NAM Function 1: For the proxy network interface, maps between the proxy IP address and the target virtual computer's IP addresses;

NAM Function 2: Configures the IP and MAC addresses of in-transit L3 packets and L2 frames to enforce virtual path traversal policies/requirements; and/or NAM Function 3: Maintains an efficient data structure, which may be indexed by packets' flow characteristics, containing information associated with recently observed in-transit frames/packets in order to recover and quickly access routing and forwarding information associated with packets in the same flow that may have been lost during proxying.

All three (3) NAM functions listed above result from a desire to assign IP addresses and MAC addresses to the virtual BITW device's network interfaces (C1 and C2 in FIG. 4); whereas by definition, a physical BITW device's network interfaces are L3- and L2-transparent, and thus there is no need for a NAM.

Regarding NAM Function 1: Recall from above, for example Step 3-2 of FIG. 3, that the Internet-Cloud NAT gateway may be configured to translate the target virtual computer(s)'s public IP address(es) to the IP address of the proxy interface of the virtual BITW device. Accordingly, for example in Step 3-1 of FIG. 3, the NAM logic may be configured to translate the proxy interface's IP address to the private IP address(es) of the target virtual computer(s).

For example, referring also to FIG. 2B, because the interface C1 241 may proxy for target virtual computer 260, when C1 receives a packet with the L3 destination IP address set to C1's IP address 10.0.1.6, the NAM logic may be configured to change the packet's destination IP address to target computer 260's IP address 10.0.2.157, and then forward the packet towards interface C2 via the fast path through the FPPP application logic. Conversely, when C2 receives a packet with the L3 source IP address set to target Computer 260's IP address 10.0.2.157, the packet may be forwarded via the fast path to the NAM, which may be configured to change the packet's source IP address to C1's IP address 10.0.1.6. C1 may then forward the packet towards its destination. If the packet's destination IP address is an Internet (or other public network) address, then the packet may pass through the NAT-G/W 220, which may translate the packet's L3 source IP address from C1's IP address 10.0.1.6 to computer 260's public IP address 174.129.20.63.

Regarding NAM Function 2: The network interfaces of the virtual BITW device may be responsible for forwarding packets towards their destinations. The forwarding function may be responsible for causing the MAC addresses of the L2 frames containing the L3 packets to be set to the proper values, for example, the MAC addresses of the terminals of the virtual path. These MAC address values may be obtained from the cloud's routing tables via the slow path, i.e., via calls to the OS kernel's TCP/IP networking stack logic;

however, for performance reasons, the virtual BITW device may not use the slow path when processing in-transit packets. By configuring the NAM logic with the proper MAC addresses information when configuring the virtual BITW device for operations, for example as in Step 3-1 of FIG. 3, then the forwarding function may obtain MAC address information from the (fast path) NAM instead of the (slow path) OS kernel's TCP/IP networking stack.

Regarding NAM Function 3: This function may be used for some cloud configurations where there are, for example, multiple virtual computers that may be proxied by another target virtual computer, e.g., a load balancer, web proxy, etc., with the associated communications passing through the virtual BITW device. For example, suppose there is no NAM Function 3; then, a request packet that is originated by one of multiple virtual computers behind a proxying target virtual computer (e.g., a load balancer) and destined for an Internet host may cause the Internet (or other public network) host to create and transmit a response packet that has the proxying load balancer's IP address as the destination. Upon receiving the response packet, the load balancer may not know which proxied virtual computer sourced/originated the corresponding request; thus, the load balancer may choose any one of the proxied virtual computers to forward the response packet towards; thus, it may be the case that the chosen proxied virtual computer may not be the originator/source of the corresponding request packet.

To handle the above example scenario and others, the NAM may include an efficient data structure that stores/caches information on recently observed L3 packets and associated L2 frames, including the packet's 5-tuple values (L3 source and destination IP addresses, L4 source and destination ports, L3 protocol type), the associated frame's MAC addresses, and/or the direction. This way, the NAM may be able to handle the example scenario above (and similar scenarios) by recovering the IP address and MAC address of the virtual computer that originated the corresponding request packet and modifying the response packet and associated frame accordingly such that the response packet is ultimately received by the proper virtual computer. Note that in keeping with fast-path performance requirements that may be in place, the efficient data structure, for example an LRU cache, may support efficient insertions, searches, and/or deletions.

Figure 5:
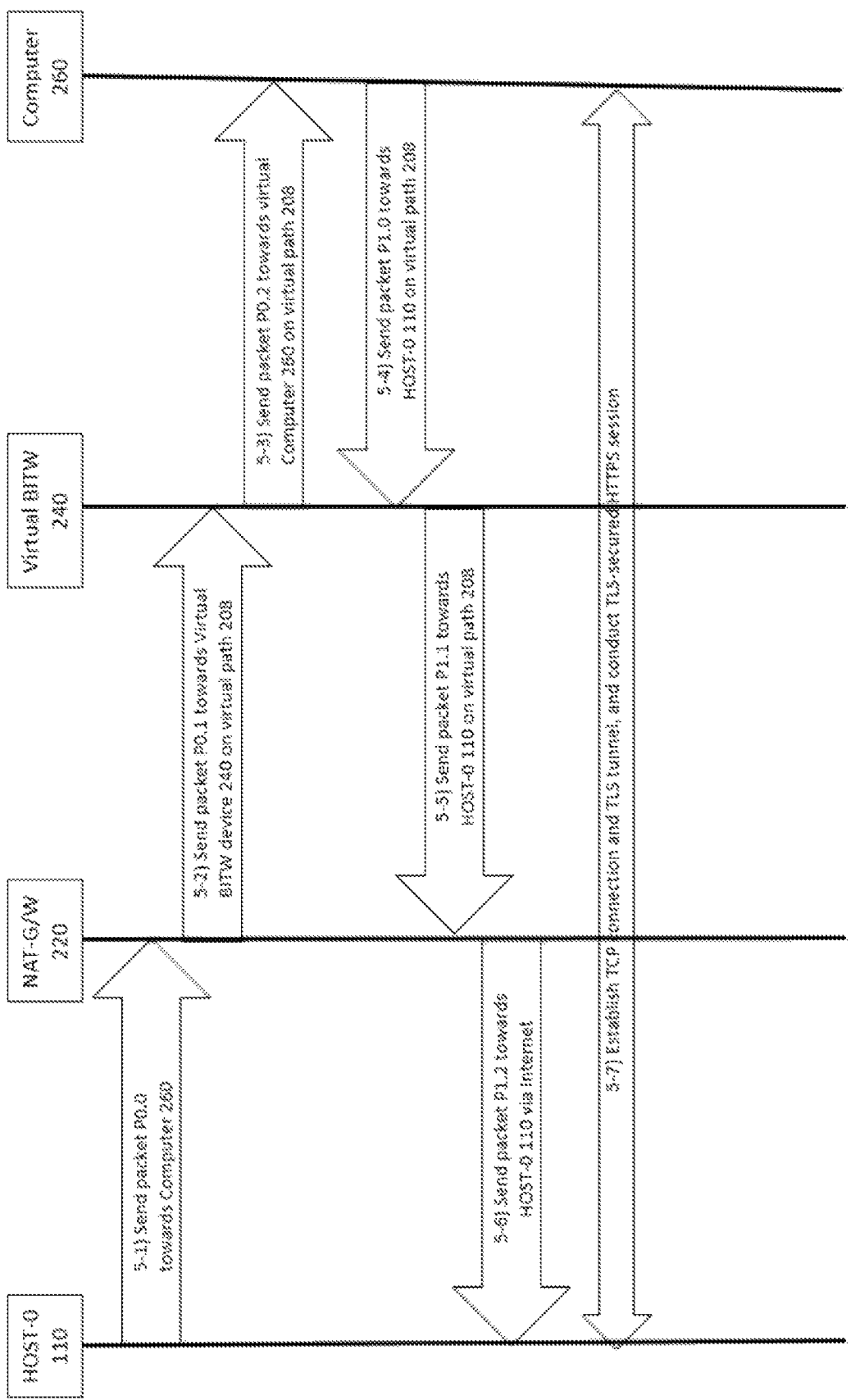
FIG. 5 shows an example ladder diagram of packet communications between an Internet host and a private cloud-connected virtual host computer that passes through a virtual BITW device.

FIG. 5 illustrates an example of a communication between the Internet host HOST-0 110 and the virtual computer 260 in the private cloud that may pass through the virtual BITW device 240 in the virtual path 208. The example network elements represented in FIG. 5 correspond to the example elements and associated configurations represented in FIG. 2B, however the elements in FIG. 5 may correspond to other configurations described herein. Also assume, for example purposes, that the virtual BITW device 240 has been deployed and configured as per Steps 3-1, 3-2, and 3-3 of FIG. 3 and is in an operational mode represented by Step 3-4 of FIG. 3.

As an example, virtual computer 260 may execute a web server application with a DNS-registered domain name www.example-web-server.net, and HOST-0 110 (addressed by, for example, public IP address 74.65.150.95) may execute a web client/web browser application. A user operating the web browser on HOST-0 110 may point the browser to the URL https://www.example-web-server.net. In Step 5-0 (not shown in FIG. 5), the browser may issue a query to the (Internet) DNS to resolve www.example-web-server.net, and the DNS may respond with the IP address 174.129.20.63.

In Step 5-1, HOST-0 110 may initiate the establishment of a TCP connection with port 443 (HTTPS) of 174.129.20.63 (i.e., virtual computer 260) by sending an TCP SYN handshake packet P0.0 with L3 source IP address 74.65.150.95 and L3 destination IP address 174.129.20.63 through the Internet towards virtual computer 260.

In Step 5-2, NAT-G/W 220 may receive packet P0.0. The NAT function may translate computer 260's public IP address 174.129.20.63 to 10.0.1.6, which may be the (private) IP address of network interface C1 241 of virtual BITW device 240, and which may be the proxy IP address for target virtual computer 260. NAT-G/W 220 may transform packet P0.0 to P0.1 as follows: (1) L3 destination IP address changed to 10.0.1.6 (the IP address of proxy network interface C1 241); (2) L2 source MAC address changed to 12:f7:4c:ac:de:7f (the MAC address of NAT-G/W 220's network interface N2 222); and (3) L2 destination MAC address changed to 12:3d:f8:07:f0:19 (the MAC address of virtual BITW device 240's network interface C1 241). Network interface N2 222 may send packet P0.1 towards virtual BITW device 240's network interface C1 241 on virtual path 208.

In Step 5-3, virtual BITW device 240 may receive packet P0.1 through its network interface C1 241. As per NAM Function 3 described above, the NAM may insert information associated with packet P0.1 into its efficient data structure for storing information associated with recently observed packets, in case the origin computer information is needed later to recover information that may be lost during the proxy transformations (not illustrated in this example). The NAM may transform packet P0.1 to P0.2 as follows: (1) L3 destination IP address changed to 10.0.2.157 (the IP address of virtual Computer 260); (2) L2 source MAC address changed to 12:a8:84:40:b6:39 (the MAC address of network interface C2 242); and (3) L2 destination MAC address changed to 12:43:9d:b6:7b:f3 (the MAC address of virtual computer 260's network interface). The NAM may forward/pipeline packet P0.2 towards C2 242. The (fast path) packet processing application processes packet P0.2. Assuming that the application does not drop/block packet P0.2, network interface C2 242 may send packet P0.2 towards virtual computer 260 on virtual path 208.

In Step 5-4, target virtual computer 260 may receive packet P0.2. Computer 260 may respond to the TCP SYN handshake signal by creating a packet P1.0 containing a TCP SYN-ACK handshake signal and with: (1) L3 source IP address set to 10.0.2.157 (the private IP address of virtual computer 260); (2) L3 destination IP address set to 74.65.150.95 (the IP address of HOST-0 110); (3) L2 source MAC address set to 12:43:9d:b6:7b:f3 (the MAC address of computer 260); and (4) L2 destination MAC address set to 12:a8:84:40:b6:39 (the MAC address of network interface C2 242 of the virtual BITW device 240). Setting packet P1.0's destination MAC address to C2 242's MAC address may help ensure that packet P1.0 traverses virtual path 208 through the virtual BITW device 240, even though P1.0's L3 destination IP address is not the IP address of C2 242. Computer 260 may send/forward packet P1.0 towards HOST-0 110 on virtual path 208.

In Step 5-5, virtual BITW device 240 may receive packet P1.0 through its network interface C2 242. As per NAM Function 3 described above, the NAM may insert information associated with packet P1.0 into its efficient data structure for storing information associated with recently observed packets, in case the origin computer information is needed later to recover information that may be lost during the proxy transformations (not illustrated in this example).

The NAM may transform packet P1.0 to P1.1 as follows: (1) L3 source IP address changed to 10.0.1.6 (the IP address of network interface C1 241, which proxies for computer 260); (2) L2 source MAC address changed to 12:3d:f8:07:f0:19 (the MAC address of network interface C1 241); and (3) L2 destination MAC address changed to 12:f7:4c:ac:de:7f (the MAC address of NAT-G/W 220's network interface N2 222). Setting packet P1.1's destination MAC address to N2 222's MAC address may help ensure that packet P1.1 traverses virtual path 208 to the NAT-G/W 220, even though P1.1's L3 destination IP address is not the IP address of N2 222. The NAM may forward/pipeline packet P1.1 towards C1 241. The (fast path) packet processing application processes packet P1.1. Assuming that the application does not drop/block packet P1.1, network interface C1 241 may send/forward packet P1.1 towards HOST-0 110 on virtual path 208.

In Step 5-6, NAT-G/W 220 may receive packet P1.1 through its network interface N2 222, which is a terminal of virtual path 208. The NAT-G/W 220 may transform packet P1.1 to P1.2 as follows: (1) L3 source IP address changed to 174.129.20.63 (the public IP address of virtual computer 260). Network interface N1 221 sends/forwards packet P.1.2 towards HOST-0 110 via the Internet.

In Step 5-7, a TCP connection and TLS tunnel between HOST-0 110 and virtual Computer 260 (which hosts web site www.example-web-site.net) may be established, and a (TLS-secured) HTTP session (e.g. HTTPS) may be conducted. Upon completion of the HTTP session, the TLS tunnel and the TCP connection may be torn down. All packets composing the communications may traverse the virtual path 208 and transit through the virtual BITW device 240 in both directions.

Figure 6:
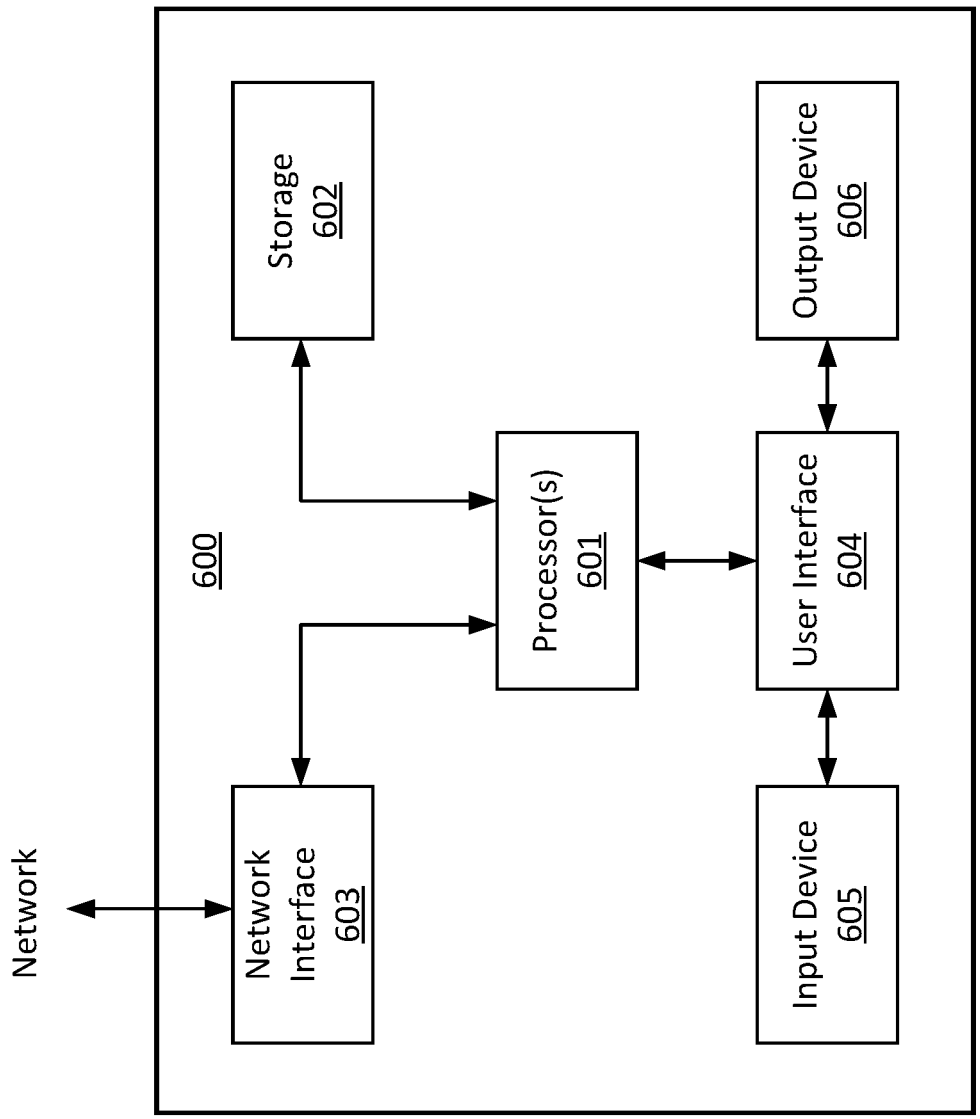
FIG. 6 shows an example computing device that may be used to implement any of the devices, systems, and method described herein.

Any of the elements described herein or illustrated in any of the figures may be partially or fully implemented using one or more computing devices. Hardware elements of an example computing device 600, which may be used to implement any of the other elements described herein, are shown in FIG. 6. Any of these hardware elements, and/or the computing device 600 itself, may be emulated in a virtual version of computing device 600. Computing device 600 may include one or more processors 601 that may execute computer-readable instructions of a computer program to perform any of the functions or other operations described herein. The instructions, along with other data, may be stored in storage 602, which may include, for example, memory such as read-only memory (ROM) and/or random access memory (RAM), a hard drive, a magnetic or optical disk, a Universal Serial Bus (USB) drive, and/or any other type of computer-readable media. Computing device 600 may also include a user interface 604 for interfacing with one or more input devices 605 such as a keyboard, mouse, voice input, etc., and for interfacing with one or more output device 606 such as a display, speaker, printer, etc. Computing device 600 may also include a network interface 603 for interfacing with one or more external devices that may be part of a network external to computing device 600. Although FIG. 6 shows an example hardware configuration, one or more of the elements of computing device 600 may be implemented as software or a combination of hardware and software. Modifications may be made to add, remove, combine, divide, etc. components of computing device 600. Additionally, the elements shown in FIG. 6 may be implemented using basic computing devices and components that have been configured to perform operations such as are described herein. Processor(s) 601 and/or storage 602 may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic.

The functions and steps described herein may be embodied in computer-usable data or computer-executable instructions, such as in one or more program modules, executed by one or more computing devices (e.g., computers or other data-processing devices) to perform one or more functions described herein. Generally, program modules may include routines, programs, objects, components, data structures, and/or other elements that perform particular tasks or implement particular abstract data types when executed by one or more processors of one or more computing devices. The computer-executable instructions may be stored on a computer-readable medium such as a hard disk, optical disk, removable storage media, solid-state memory, RAM, etc. As will be appreciated, the functionality of the program modules may be combined or distributed as desired. In addition, the functionality may be embodied in whole or in part in firmware or hardware equivalents, such as integrated circuits, application-specific integrated circuits (ASICs), field-programmable gate arrays (FPGA), and the like. Particular data structures may be used to more effectively implement one or more aspects of the disclosure, and such data structures are contemplated to be within the scope of computer-executable instructions and computer-usable data described herein.

Although not required, one of ordinary skill in the art will appreciate that various aspects described herein may be embodied as a method, system, apparatus, or one or more computer-readable media storing computer-executable instructions that, when executed by one or more processors of a computing device, cause the computing device to perform steps as disclosed herein. Accordingly, aspects may take the form of an entirely hardware embodiment, an entirely software embodiment, an entirely firmware embodiment, an entirely virtual embodiment, or an embodiment combining software, hardware, virtualized, and/or firmware aspects in any combination.

As described herein, the various methods and acts may be operative across one or more physically separate or integrated computing devices (which together may form a computing device) and networks. The functionality may be distributed in any manner or may be located in a single physical computing device or virtual version of a computing device (e.g., a server, client computer, a user device, a virtual environment, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order and that one or more illustrated steps may be optional.

What is claimed is:

1. A cloud computing network configured to send packets between a network address translation (NAT) gateway and a second virtual device, via a virtual bump-in-the-wire (BITW) device, the cloud computing network comprising:
  one or more processors;
  the NAT gateway, wherein the NAT gateway is configured to interface between a public network and the cloud computing network;
  the virtual BITW device, comprising:
    a first interface having a private Internet Protocol (IP) address in a first subnet, wherein a virtual path terminal of the NAT gateway and the first interface of the virtual BITW device are exclusively associated with the first subnet;
    a second interface having a private IP address in a second subnet, wherein a virtual path terminal of the second virtual device and the second interface of the virtual BITW device are exclusively associated with the second subnet; and
    a fast path between the first interface and the second interface and configured to apply packet-filtering logic to traffic received by the virtual BITW device; and
  the second virtual device,
  wherein the NAT gateway is configured to:
    receive packets indicating a public IP address of the second virtual device as a destination IP address;
    modify the destination IP address of the packets to be the private IP address of the first interface of the virtual BITW device; and
    send the packets, via the virtual path terminal of the NAT gateway, to the first interface of the virtual BITW device, and
  wherein the virtual BITW device is configured to:
    receive, via the first interface, the packets from the NAT gateway;
    modify the destination IP address of the packets to be a private IP address of the second virtual device;
    apply, using the fast path, the packet-filtering logic to the packets received via the first interface; and
    send, based on the packet-filtering logic, via the second interface of the virtual BITW device, and via the virtual path terminal of the second virtual device, at least a portion of the packets.

2. The cloud computing network of claim 1, wherein the packets indicate a media access control (MAC) address of the NAT gateway as a source MAC address, and indicate a MAC address of the first interface of the virtual BITW device as a destination MAC address, and wherein the virtual BITW device is further configured to:
  modify the source MAC address of the at least a portion of the packets to be a MAC address of the second interface of the virtual BITW device; and
  modify the destination MAC address of the at least a portion of the packets to be a MAC address of the second virtual device.

3. The cloud computing network of claim 1, wherein the virtual BITW device is configured to cache 5-tuple values for each of a plurality of packets received by the second interface.

4. The cloud computing network of claim 1, wherein the first subnet and the second subnet are non-overlapping.

5. The cloud computing network of claim 1, wherein the packet-filtering logic comprises packet-filtering rules.

6. The cloud computing network of claim 1, wherein the packet-filtering logic comprises policy enforcement logic.

7. The cloud computing network of claim 1, wherein the virtual BITW device is configured to prevent, based on the packet-filtering logic, one or more of the packets received via the first interface from being sent via the second interface.

8. The cloud computing network of claim 1, wherein a cloud routing table of the cloud computing network is configured to cause second packets, sent by the second virtual device and destined for a host outside the cloud computing network, to be received by the second interface of the virtual BITW device.

9. The cloud computing network of claim 8, wherein:
  the second virtual device is configured to send the second packets, wherein the second packets indicate the private IP address of the second virtual device as a source IP address and indicate a public IP address of the host as a destination IP address; and
  the virtual BITW device is configured to:
    receive, via the second interface, the second packets;
    modify the source IP address of the second packets to be the private IP address of the first interface of the virtual BITW device;
    apply, using the fast path, the packet-filtering logic to the second packets; and
    send, based on the packet-filtering logic and via the first interface, at least a portion of the second packets to the NAT gateway.

10. The cloud computing network of claim 8, wherein the second packets sent by the second virtual device indicate a media access control (MAC) address of the second virtual device as a source MAC address and indicate a MAC address of the second interface of the virtual BITW device as a destination MAC address.

11. The cloud computing network of claim 10, wherein the virtual BITW device is configured to:
  modify the source MAC address of the second packets to be the MAC address of the first interface of the virtual BITW device; and
  modify the destination MAC address of the second packets to be a MAC address of the NAT gateway.

12. A non-transitory computer-readable medium storing instructions that, when executed by one or more processors, cause a cloud computing network to send packets between a network address translation (NAT) gateway and a second virtual device, via a virtual bump-in-the-wire (BITW) device, by:
  receiving, by the NAT gateway, packets indicating a public IP address of the second virtual device as a destination IP address, wherein the NAT gateway is configured to interface between a public network and the cloud computing network;
  modifying, by the NAT gateway, the destination IP address of the packets to be a private IP address of a first interface of the virtual BITW device, wherein the private IP address of the first interface is in a first subnet, and wherein a virtual path terminal of the NAT gateway and the first interface of the virtual BITW device are exclusively associated with the first subnet;
  sending, via the virtual path terminal of the NAT gateway, the packets to the first interface of the virtual BITW device;
  receiving, via the first interface, the packets from the NAT gateway;
  applying, using a fast path of the virtual BITW device, packet-filtering logic to the packets received via the first interface;
  modifying the destination IP address of the packets to be a private IP address of the second virtual device; and sending, by the virtual BITW, based on the packet-filtering logic, via a second interface having a private IP address in a second subnet, and via a virtual path terminal of the second virtual device, at least a portion of the packets, wherein the virtual path terminal of the second virtual device and the second interface are exclusively associated with the second subnet.

13. The non-transitory computer-readable medium of claim 12, wherein the packets indicate a media access control (MAC) address of the NAT gateway as a source MAC address, and indicate a MAC address of the first interface of the virtual BITW device as a destination MAC address, and wherein the instructions, when executed by the one or more processors, cause the virtual BITW device to further:
   modify the source MAC address of the at least a portion of the packets to be a MAC address of the second interface of the virtual BITW device; and
   modify the destination MAC address of the at least a portion of the packets to be a MAC address of the second virtual device.

14. The non-transitory computer-readable medium of claim 12, wherein the instructions, when executed by the one or more processors, cause the virtual BITW device to cache 5-tuple values for each of a plurality of packets received by the second interface.

15. The non-transitory computer-readable medium of claim 12, wherein the first subnet and the second subnet are non-overlapping.

16. The non-transitory computer-readable medium of claim 12, wherein the packet-filtering logic comprises packet-filtering rules.

17. The non-transitory computer-readable medium of claim 12, wherein the packet-filtering logic comprises policy enforcement logic.

18. The non-transitory computer-readable medium of claim 12, the instructions, when executed by the one or more processors, cause the virtual BITW device to prevent, based on the packet-filtering logic, one or more of the packets received via the first interface from being sent via the second interface.

19. The non-transitory computer-readable medium of claim 12, wherein a cloud routing table of the cloud computing network is configured to cause second packets, sent by the second virtual device and destined for a host outside the cloud computing network, to be received by the second interface of the virtual BITW device.

20. The non-transitory computer-readable medium of claim 19, wherein:
   the instructions, when executed by the one or more processors, cause the second virtual device to send the second packets, wherein the second packets indicate the private IP address of the second virtual device as a source IP address and indicate a public IP address of the host as a destination IP address; and
   the instructions, when executed by the one or more processors, cause the virtual BITW device to:
      receive, via the second interface, the second packets;
      modify the source IP address of the second packets to be the private IP address of the first interface of the virtual BITW device;
      apply, using the fast path, the packet-filtering logic to the second packets; and
      send, based on the packet-filtering logic and via the first interface, at least a portion of the second packets to the NAT gateway.

21. The non-transitory computer-readable medium of claim 19, wherein the second packets sent by the second virtual device indicate a media access control (MAC) address of the second virtual device as a source MAC address and indicate a MAC address of the second interface of the virtual BITW device as a destination MAC address.

22. The non-transitory computer-readable medium of claim 21, wherein the instructions, when executed by the one or more processors, cause the virtual BITW device to:
   modify the source MAC address of the second packets to be the MAC address of the first interface of the virtual BITW device; and
   modify the destination MAC address of the second packets to be a MAC address of the NAT gateway.

23. A method for sending packets in a virtual private cloud network between a network address translation (NAT) gateway and a second virtual device, via a virtual bump-in-the-wire (BITW) device, the method comprising:
   receiving, by the NAT gateway, packets indicating a public IP address of the second virtual device as a destination IP address, wherein the NAT gateway is configured to interface between a public network and the virtual private cloud network;
   modifying, by the NAT gateway, the destination IP address of the packets to be a first private IP address of a first interface of the virtual BITW device, wherein the private IP address of the first interface is in a first subnet, and wherein a virtual path terminal of the NAT gateway and the first interface of the virtual BITW device are exclusively associated with the first subnet;
   sending, via the virtual path terminal of the NAT gateway, the packets to the first interface of the virtual BITW device;
   receiving, via the first interface, the packets from the NAT gateway;
   applying, using a fast path of the virtual BITW device, packet-filtering logic to the packets received via the first interface;
   modifying the destination IP address of the packets to be a private IP address of the second virtual device; and
   sending, by the virtual BITW, based on the packet-filtering logic, via a second interface having a private IP address in a second subnet, and via a virtual path terminal of the second virtual device, at least a portion of the packets, wherein the virtual path terminal of the second virtual device and the second interface are exclusively associated with the second subnet.

24. The method of claim 23, wherein the packets indicate a media access control (MAC) address of the NAT gateway as a source MAC address, and indicate a MAC address of the first interface of the virtual BITW device as a destination MAC address, and wherein the method further comprises:
   modifying, by the virtual BITW device, the source MAC address of the at least a portion of the packets to be a MAC address of the second interface of the virtual BITW device; and
   modifying, by the virtual BITW device, the destination MAC address of the at least a portion of the packets to be a MAC address of the second virtual device.

25. The method of claim 23, wherein the virtual BITW device is configured to cache 5-tuple values for each of a plurality of packets received by the second interface.

26. The method of claim 23, wherein the first subnet and the second subnet are non-overlapping.

27. The method of claim 23, wherein a virtual path terminal of the NAT gateway and the first interface of the virtual BITW device are exclusively associated with the first subnet, and wherein a virtual path terminal of the second virtual device and the second interface of the virtual BITW device are exclusively associated with the second subnet.

28. The method of claim 23, wherein the packet-filtering logic comprises packet-filtering rules.

29. The method of claim 23, wherein the packet-filtering logic comprises policy enforcement logic.

30. The method of claim 23, further comprising preventing, based on the packet-filtering logic, one or more of the packets received via the first interface from being sent via the second interface.

31. The method of claim 23, wherein a cloud routing table of the virtual private cloud network is configured to cause second packets, sent by the second virtual device and destined for a host outside the virtual private cloud network, to be received by the second interface of the virtual BITW device.

32. The method of claim 31, further comprising:
sending, by the second virtual device, the second packets, wherein the second packets indicate the private IP address of the second virtual device as a source IP address and indicate a public IP address of the host as a destination IP address;
receiving, via the second interface of the virtual BITW device, the second packets;
modifying, by the virtual BITW device, the source IP address of the second packets to be the private IP address of the first interface of the virtual BITW device;
applying, using the fast path, the packet-filtering logic to the second packets; and
sending, via the first interface of the virtual BITW device, at least a portion of the second packets to the NAT gateway.

33. The method of claim 31, wherein the second packets sent by the second virtual device indicate a media access control (MAC) address of the second virtual device as a source MAC address and indicate a MAC address of the second interface of the virtual BITW device as a destination MAC address.

34. The method of claim 33, wherein the virtual BITW device is configured to:
modify the source MAC address of the second packets to be the MAC address of the first interface of the virtual BITW device; and
modify the destination MAC address of the second packets to be a MAC address of the NAT gateway.

35. A method comprising:
deploying a virtual bump-in-the wire (BITW) device in a virtual private cloud network, wherein the virtual BITW device comprises:
a first interface having a private Internet Protocol (IP) address in a first subnet, wherein the first interface of the virtual BITW and a virtual path terminal of a network address translation (NAT) gateway are exclusively associated with the first subnet, and wherein the NAT gateway interfaces between a public network and the virtual private cloud network;
a second interface having a private IP address in a second subnet, wherein the second interface of the virtual BITW and a virtual path terminal of a second virtual device are exclusively associated with the second subnet; and
a fast path between the first interface and the second interface and configured to apply packet-filtering logic to traffic received by the virtual BITW device;
configuring the NAT gateway to modify a destination IP address of packets destined for the second virtual device via the virtual path terminal of the NAT gateway, comprising configuring the NAT gateway to translate a public IP address of the second virtual device to the private IP address of the first interface of the virtual BITW device; and
configuring the virtual BITW device to send, via the fast path, via the second interface of the virtual BITW and the virtual path terminal of the second virtual device, and based on the packet-filtering logic, at least a portion of the packets received via the first interface, to the second virtual device by configuring the virtual BITW device to modify destination IP addresses of packets received by the first interface to be the private IP address of the second virtual device.

36. The method of claim 35, wherein the packets indicate a media access control (MAC) address of the NAT gateway as a source MAC address, and indicate a MAC address of the first interface of the virtual BITW device as a destination MAC address, and wherein the configuring the virtual BITW device to send at least a portion of the packets received via the first interface further comprises configuring the virtual BITW device to:
modify the source MAC address of the at least a portion of the packets to be a MAC address of the second interface of the virtual BITW device; and
modify the destination MAC address of the at least a portion of the packets to be a MAC address of the second virtual device.

37. The method of claim 35, further comprising configuring the virtual BITW device to cache 5-tuple values for each of a plurality of packets received by the second interface.

38. The method of claim 35, wherein the first subnet and the second subnet are non-overlapping.

39. The method of claim 35, wherein a virtual path terminal of the NAT gateway and the first interface of the virtual BITW device are exclusively associated with the first subnet, and wherein a virtual path terminal of the second virtual device and the second interface of the virtual BITW device are exclusively associated with the second subnet.

40. The method of claim 35, wherein the packet-filtering logic comprises packet-filtering rules.

41. The method of claim 35, wherein the packet-filtering logic comprises policy enforcement logic.

42. The method of claim 35, further comprising configuring the virtual BITW device to prevent, based on the packet-filtering logic, one or more of the packets received via the first interface from being sent via the second interface.

43. The method of claim 35, further comprising configuring a cloud routing table of the virtual private cloud network to cause second packets, sent by the second virtual device and destined for a host outside the virtual private cloud network, to be received by the second interface of the virtual BITW device.

44. The method of claim 43, wherein the second packets indicate the private IP address of the second virtual device as a source IP address and indicate a public IP address of the host as a destination IP address, the method further comprising configuring the virtual BITW device to send at least a portion of the second packets received via the second interface by configuring the virtual BITW device to:
modify the source IP address of the second packets to be the private IP address of the first interface of the virtual BITW device;
apply, using the fast path, the packet-filtering logic to the second packets; and send, via the first interface of the virtual BITW device, at least a portion of the second packets to the NAT gateway.

46. The method of claim 43, wherein the second packets sent by the second virtual device indicate a media access control (MAC) address of the second virtual device as a source MAC address and indicate a MAC address of the second interface of the virtual BITW device as a destination MAC address.

46. The method of claim 45, further comprising configuring the virtual BITW device to:
   modify the source MAC address of the second packets to be the MAC address of the first interface of the virtual BITW device; and
   modify the destination MAC address of the second packets to be a MAC address of the NAT gateway.

* * * * *